United States Patent
Cook, III et al.

(10) Patent No.: US 10,920,889 B2
(45) Date of Patent: Feb. 16, 2021

(54) ROTATING SHAFT MECHANICAL SEAL

(71) Applicant: ExxonMobil Chemical Patents Inc., Baytown, TX (US)

(72) Inventors: Norman F. Cook, III, Kingwood, TX (US); Robert G. Depierri, Baton Rouge, LA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 92 days.

(21) Appl. No.: 16/323,721

(22) PCT Filed: Jul. 31, 2017

(86) PCT No.: PCT/US2017/044687
§ 371 (c)(1),
(2) Date: Feb. 6, 2019

(87) PCT Pub. No.: WO2018/044459
PCT Pub. Date: Mar. 8, 2018

(65) Prior Publication Data
US 2019/0211932 A1 Jul. 11, 2019

Related U.S. Application Data

(60) Provisional application No. 62/381,810, filed on Aug. 31, 2016.

(51) Int. Cl.
*F16J 15/34* (2006.01)

(52) U.S. Cl.
CPC ....... *F16J 15/3484* (2013.01); *F16J 15/3496* (2013.01)

(58) Field of Classification Search
CPC ...... F16J 15/34; F16J 15/3484; F16J 15/3496; F16J 15/348; F16J 15/3436
USPC ........................................................ 277/361
See application file for complete search history.

(56) References Cited

U.S. PATENT DOCUMENTS

| | | | | |
|---|---|---|---|---|
| 2,937,896 A | * | 5/1960 | Jones | F16J 15/3484 277/366 |
| 3,484,113 A | * | 12/1969 | Moore | F16J 15/38 277/366 |
| 4,336,944 A | * | 6/1982 | Blair | F16J 15/3496 277/399 |
| 4,381,867 A | * | 5/1983 | Ohgoshi | F16J 15/3484 277/366 |
| 6,315,297 B1 | * | 11/2001 | Conway | F16J 15/3404 277/362 |
| 2012/0025473 A1 | | 2/2012 | Takahashi | |
| 2015/0152966 A1 | * | 6/2015 | Sardinskas | F16J 15/185 366/98 |

\* cited by examiner

*Primary Examiner* — Nathan Cumar
(74) *Attorney, Agent, or Firm* — ExxonMobil Chemical Patents Inc.—Law Department

(57) ABSTRACT

A rotating shaft seal for a rotating shaft containing a rotating assembly attached to the rotating shaft, wherein the sealing force applied to both ends of the rotating shaft within the housing is created within the rotating assembly and is applied substantially equally to both seal rings.

9 Claims, 3 Drawing Sheets

ROTATING SHAFT MECHANICAL SEAL

CROSS-REFERENCE OF RELATED APPLICATIONS

This application is a National Phase Application claiming priority to PCT Application Serial No. PCT/US2017/044687 filed Jul. 31, 2017, which claims priority to and the benefit of U.S. Provisional Serial No. 62/381,810 filed Aug. 31, 2016, the disclosure of which are fully incorporated herein by reference in their entireties.

FIELD OF THE INVENTION

The invention relates to a rotating shaft mechanical seal, such as an extruder shaft seal for a polymer extruder, containing a redesigned rotating assembly attached to the rotating shaft, wherein the sealing force applied to both ends of the shaft within the housing is created within the rotating assembly and is applied equally to both seal rings. The mechanical seals can also find use in other processing machinery which have rotating shafts, such as mixers, blenders and screw conveyors used in the plastics, chemical, metals, pharmaceutical and food processing industries.

BACKGROUND OF THE INVENTION

Conventional rotating shaft mechanical seals are designed to prevent the component being transferred, such as polymer powder being fed into an extruder, from escaping to the atmosphere where the rotating shaft(s) penetrate the machinery housing. The operating conditions of, for example, a polymer extruder are very rigorous, operating at temperatures high enough to melt the polymer of interest, and at internal pressures sufficient to extrude the viscous, molten polymer through small dies to the exterior of the system. The conventional seals are mechanical seals having stationary components fastened to a machine housing and a rotating assembly fastened to the rotating shaft which rotates with the shaft. There are generally two faces where the stationary components contact the rotating components resulting in dynamic seals.

Conventional rotating shaft mechanical seals have a housing that consists of three components: a main housing and inboard and outboard mating rings. The inboard mating ring is attached to both the machinery housing and to the seal housing, and the outboard mating ring to only the seal housing. Within the seal housing, the mating rings are sealed against an inner rotating assembly fastened to the rotating shaft and having inboard and outboard sealing rings biased against the inboard and outboard mating rings. However, in order to accommodate for the location of the rotating shaft passing through the seal housing, the mounting hardware for the mating rings is not centered on the shaft, but oriented above the axis of the shaft. When the mounting hardware for the outboard mating ring is tightened against the seal housing to provide the sealing force, the force can be applied in only one direction, i.e., from the outer mating ring toward the machine housing, and is not evenly distributed through the housing, but only on the outer circumferences of the outboard mating ring.

Additionally, the rotating shaft seals and housing can be cooled with a purge gas flow, such as nitrogen, which creates an internal pressure within the housing and exits through leaks between the seals and the rotating shaft. When there is a good seal between seals and shaft, insufficient gas flow through the system results in overheating of the seals.

A spring force is applied between the stationary outboard mating ring and the outboard sealing ring of the rotating assembly. This spring force is diminished by the purge gas pressure within the seal housing. When the seal against the rotating shaft is good and there is insufficient leakage of purge gas across the seal, it is often necessary to increase the purge gas pressure in an effort to create cooling gas flow, which counteracts to some extent the spring force against the outboard sealing ring.

U.S. Patent Publication No. 2015/0152966 to Sardinskas et al., discloses a shaft seal assembly for sealing along a rotor shaft. The shaft seal assembly includes a seal housing, annular inner and outer seal members, an annular middle element, and an end plate. The seal housing has a seal member bore and a shaft bore. The annular inner and outer seal members are configured to be disposed in the seal member bore. The middle element is disposed between the inner seal member and the outer seal member within the seal member bore. The end plate is attached to the seal housing and covers a portion of the seal member bore. The middle element biases the inner seal member against the seal housing and biases the outer seal member against the end plate. The shaft seal assembly is rotationally stationary relative to the rotor shaft.

Accordingly, there is a need for an improved rotating shaft seal, which provides both uniform sealing pressure between inboard and outboard sealing surfaces and adequate purge gas flow throughout the assembly.

SUMMARY OF THE INVENTION

Presented is a rotating assembly for a rotating shaft seal, such as an extruder shaft seal, comprising a drive sleeve body structured and arranged to surround and contact a rotating shaft, the drive sleeve body having a central portion extending radially outward from the rotating shaft, and inboard and outboard portions extending axially along the rotating shaft, inboard and outboard seal ring carriers mounted concentrically around the axially extending portions of the drive sleeve body, and inboard and outboard seal rings positioned within outer races on radial faces of both seal ring carriers, a surface of each seal ring biased axially into contact with one or more interior surfaces of a stationary housing assembly for the rotating assembly.

In one embodiment, the seal ring carriers of the rotating assembly are axially slidable on the axially extending portions of the drive sleeve.

In another embodiment, the rotating assembly includes a series of compression springs disposed around the central portion of the drive sleeve body and captive between the central portion and the inboard and outboard seal ring carriers, which springs are structured and arranged to create a sealing force which substantially equally biases the seal ring carriers and the seal rings axially toward the interior surfaces of the stationary housing assembly.

In another embodiment, the rotating assembly includes a series of drive pins disposed around the central portion of the drive sleeve body and captive between the central portion and the inboard and outboard seal ring carriers, which drive pins are structured and arranged to maintain the seal ring carriers in rotational alignment with the drive sleeve.

In yet another embodiment, the sealing force against the seal ring carriers is created within the rotating assembly by the compression springs.

In a further embodiment, the seal rings are made from a fiber-reinforced fluoropolymer.

In another embodiment, O-rings are placed in slots around and between the drive sleeve and the seal ring carriers.

In another embodiment, the drive sleeve and the seal ring carriers are made of metals having substantially the same thermal conductivities, such as where the drive sleeve and the seal ring carriers are made of the same metal.

Another embodiment of the invention is directed to a rotating shaft seal, comprising a substantially cylindrical housing structured and arranged to be affixed to an exterior wall of a machine housing and to receive a rotating shaft extending axially therethrough, a mating ring attached to each interior wall of the cylindrical housing, each ring having an axial aperture of sufficient diameter to accommodate the rotating shaft, and an internal rotating sealing assembly, including a drive sleeve body structured and arranged to surround and contact the rotating shaft, the drive sleeve body having a central portion extending radially outward from the rotating shaft, and inboard and outboard portions extending axially along the rotating shaft, inboard and outboard seal ring carriers mounted concentrically around the axially extending portions of the drive sleeve body, and inboard and outboard seal rings positioned within outer races on radial faces of both seal ring carriers, a surface of each seal ring biased axially into contact with the mating rings attached to each interior wall of the cylindrical housing.

In a further embodiment, the rotating shaft seal includes flow passages formed on an outer circumference of the mating rings for purge gas flow.

In another embodiment, the flow passages for purge gas flow around the mating rings communicate with one or more spaces between outer surfaces of the rotating seal assembly and the inner surface of the cylindrical housing, such that purge gas can be circulated throughout the rotating shaft seal.

Additionally, the rotating shaft seal includes a purge gas inlet and a purge gas outlet in the substantially cylindrical housing.

In another embodiment, the seal ring carriers of the rotating sealing assembly are axially slidable on said axially extending portions of said drive sleeve.

In another embodiment, the rotating sealing assembly includes a series of compression springs disposed around the central portion of the drive sleeve body and captive between said central portion and the inboard and outboard seal ring carriers, which springs are structured and arranged to create a sealing force which substantially equally biases the seal ring carriers and the seal rings axially toward the mating rings of the cylindrical housing assembly.

In a further embodiment, the rotating sealing assembly includes a series of drive pins disposed around the central portion of the drive sleeve body and captive between said central portion and the inboard and outboard seal ring carriers, which drive pins are structured and arranged to maintain the seal ring carriers in rotational alignment with the drive sleeve.

Additionally, the sealing force against the seal ring carriers is created within the rotating assembly by the compression springs.

In another embodiment, the seal rings of the rotating sealing assembly are made from a fiber-reinforced fluoropolymer.

In a further embodiment, O-rings are placed in slots around and between the drive sleeve and the seal ring carriers of the rotating sealing assembly.

In a further embodiment, the drive sleeve and the seal ring carriers are made of metals having substantially the same thermal conductivities, such as where the drive sleeve and the seal ring carriers are made of the same metal.

DETAILED DESCRIPTION

Figure 1:
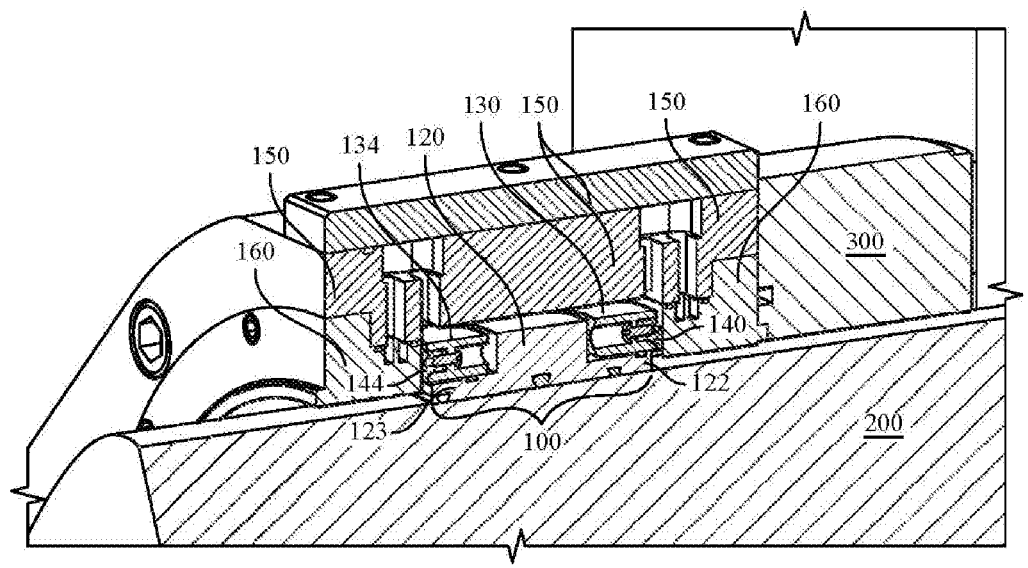
FIG. 1 is a cross-sectional illustration of the rotating seal according to the invention.

While the specific application discussed herein is directed to sealing a rotating extruder shaft exiting a polymer extruder, it should be understood that the rotating shaft seal can be applied to other types of machinery having rotating shafts which need to be sealed against leakage to the external environment, such as those in mixers, blenders, screw conveyors and the like. Accordingly, the presently disclosed rotating shaft seals should not be considered to be limited to use with polymer extruders.

The invention relates to a rotating shaft seal, such as for a polymer extruder having a substantially cylindrical housing containing a redesigned rotating assembly attached to a rotating extruder shaft, wherein the sealing force applied to both ends of the extruder shaft within the housing is created within the rotating assembly and is applied equally to both seal rings. The disclosed design avoids applying the sealing force from only one direction, resulting in improved force distribution over conventional seals.

In one embodiment, the invention is directed to an extruder shaft seal having a substantially cylindrical housing which is structured and arranged to be affixed to an exterior wall of an extruder housing and to receive an extruder shaft extending axially therethrough, a mating ring attached to each interior wall of the cylindrical housing, each ring having an axial aperture of sufficient diameter to accommodate the extruder shaft, and an internal rotating sealing assembly, including a drive sleeve body structured and arranged to surround and contact the extruder shaft, the drive sleeve body having a central portion extending radially outward from the extruder shaft, and inboard and outboard portions extending axially along the extruder shaft, inboard and outboard seal ring carriers mounted concentrically around the axially extending portions of the drive sleeve body, and inboard and outboard seal rings positioned within outer races on radial faces of both seal ring carriers, a surface of each seal ring biased axially into contact with the mating rings attached to each interior wall of the cylindrical housing.

Advantageously, the improved design of the extruder shaft seal provides for force being exerted and distributed equally against the inboard and outboard shaft seals from within the rotating assembly, rather than from only the outboard side. This equally distributed force results in more consistent sealing of the extruder shaft and thereby reduced seal failure. Likewise, the provision for both purge gas inlet and outlet ports results in more consistent purge gas flow, as compared to the leak flow of the conventional design, and reduced seal failure.

Definitions

As used in this application, the terms "inboard" and "outboard" are understood to be with respect to a machine housing, such as a polymer extruder housing. An "inboard" apparatus should be understood to be adjacent the machine housing, while an "outboard" apparatus is located remotely from the machine, such as on or in the opposite side of the seal housing from the machine housing.

The improvements and advantages of the present invention will be more thoroughly illustrated and understood by review of the accompanying figures, wherein like reference numerals refer to like elements.

FIG. 1

FIG. 1 is a cross-sectional illustration of an extruder seal according to the invention. The extruder seal includes a substantially cylindrical seal housing 150 having an inboard side attached to an extruder body 300 and surrounding an extruder shaft 200. Mounted within the seal housing 150 are inboard and outboard mating rings 160 which are essentially identical in shape. Each mating ring has an axial aperture of sufficient diameter to accommodate the extruder shaft 200. The mating ring material is advantageously 4340 HT carbon steel, which has a thermal conductivity about 2.5 times greater than more conventional stainless steel. The mating rings can be plated with electroless nickel, yielding a surface hardness of about 50 Rc.

Figure 4:
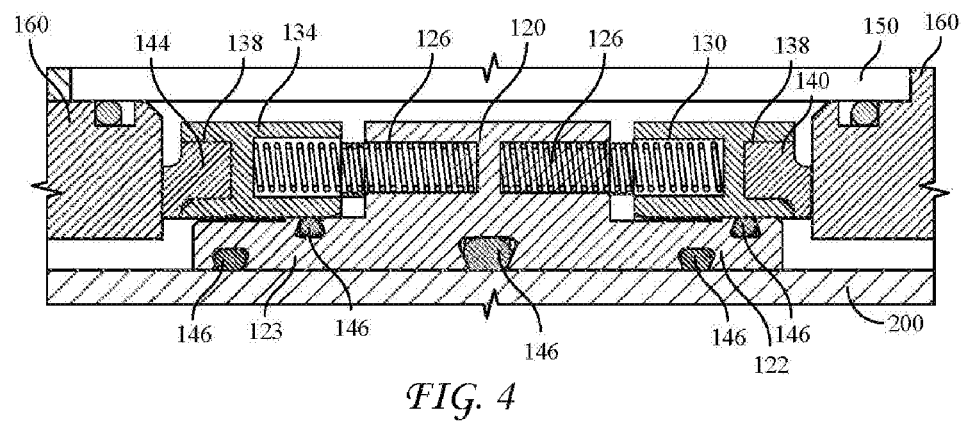
FIG. 4 is a detailed cross-sectional view of the rotating assembly at section 4-4 of FIG. 2.

Also mounted within the seal housing 150 is a rotating assembly 100, which is held in position around the portion of the extruder shaft 200 within the seal housing. The rotating assembly 100 is held against the extruder shaft 200 with only enough force such that it can float axially relative to or slide along the extruder shaft 200. Sealing of the rotating assembly 100 to the extruder shaft 200 is provided by a series of O-rings 146 (FIG. 4). Rotating assembly 100 includes a drive sleeve body structured and arranged to surround and contact the extruder shaft, having a central portion 120 extending radially outward from the extruder shaft, and inboard 122 and outboard 123 portions extending axially along the extruder shaft. The inboard 122 and outboard 123 portions of the drive sleeve body have inboard 130 and outboard 134 seal ring carriers, respectively, mounted concentrically around the axially extending portions 122, 123 of the drive sleeve body. Positioned within the seal ring carriers are inboard 140 and outboard 144 seal rings, positioned within outer surfaces 138 (FIG. 4) on radial faces of both seal ring carriers. A surface of each seal ring is biased axially into contact with the stationary mating rings 160 attached to each interior wall of the substantially cylindrical seal housing.

Advantageously, seal rings 140, 144 are made of a fiber-reinforced fluorocarbon polymer, such as Vespel®, which has a low friction coefficient and as such yields lower heat generation. The thermal expansion coefficient is about half that of steel.

FIG. 2

Figure 2:
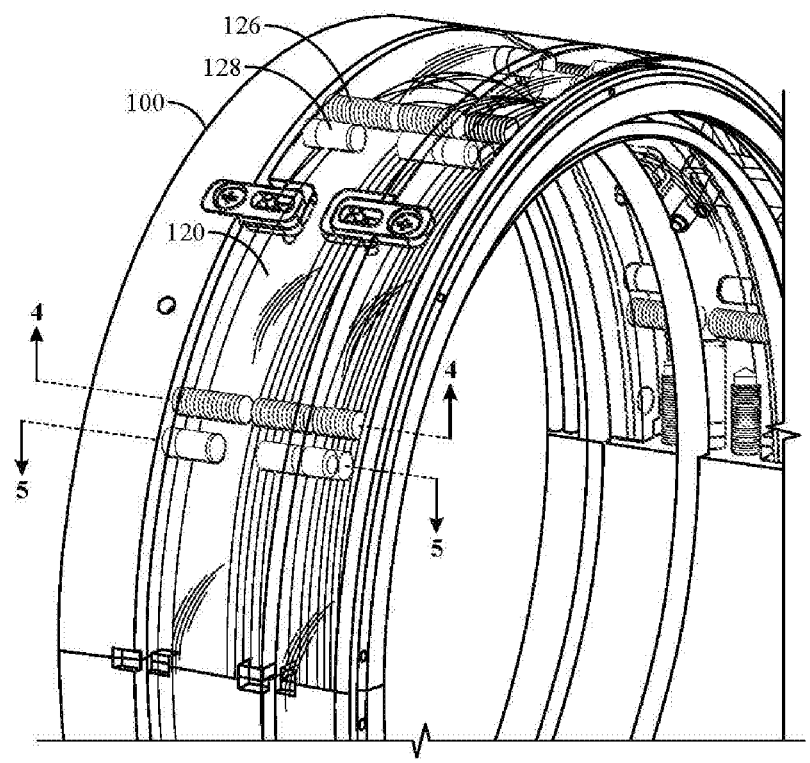
FIG. 2 is cutaway view of the exterior of the rotating assembly of the rotating seal according to the invention.

FIG. 2 is cutaway view of the exterior of the rotating assembly 100 of the extruder seal according to the invention. This view illustrates the locations of the compression springs 126 and drive pins 128 relative to the central portion of the drive sleeve body 120, better illustrated in FIGS. 4 and 5, which are cross-sections of the rotating assembly of FIG. 2 at sections 4-4 and 5-5, respectively.

FIG. 3

Figure 3:
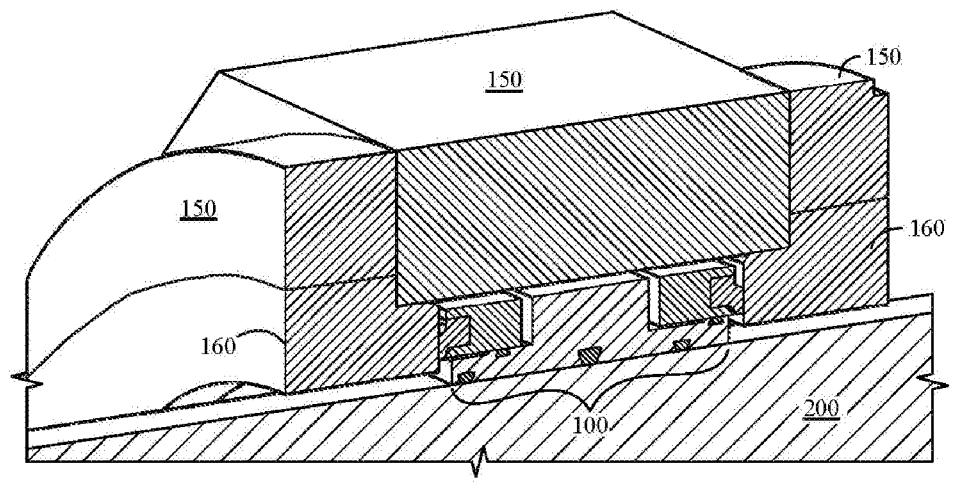
FIG. 3 is a simplified cross-sectional illustration of the rotating portion of the rotating seal mouted within its stationary housing according to the invention.

FIG. 3 is a simplified cross-sectional illustration of the rotating assembly 100 of the extruder seal mouted within its stationary, substantially cylindrical housing 150 according to the invention. The location of the rotating assembly 100 relative to the mating rings 150 and extruder shaft 200 is illustrated.

FIG. 4

FIG. 4 is a detailed cross-sectional view of the rotating assembly 100 at section 4-4 of FIG. 2. The rotating assembly 100 of the extruder shaft seal has a drive sleeve body structured and arranged to surround and contact the extruder shaft 200, the drive sleeve body having a central portion 120 extending radially outward from the extruder shaft 200, and inboard 122 and outboard 123 portions extending axially along the extruder shaft 200. Additionally, inboard 130 and outboard 134 seal ring carriers are mounted concentrically around the axially extending portions 122 and 123 respectively, of the drive sleeve body. The inboard 130 and outboard 134 seal rings are positioned within outer races 138 on the radial faces of both seal ring carriers, such that a surface of each seal ring 130, 134 is biased axially into contact with one or more interior surfaces, such as the mating rings 160, of a stationary, substantially cylindrical housing assembly 150 for the rotating assembly 100.

The seal ring carriers 130, 134 are axially slidable on said axially extending portions 122, 123 of said drive sleeve, and are biased toward mating rings 160 by a series of compression springs 126 disposed around the central portion 120 of the drive sleeve and captive between said central portion 120 and the inboard 130 and outboard 134 seal ring carriers. The springs create a sealing force which equally biases the seal ring carriers 130, 134 and the seal rings 140, 144 axially toward the interior surfaces of the mating rings 160. By virtue of this arrangement, the sealing force is created and applied within the rotating assembly 100 by the compression springs 126. The necessity of applying an outside force to form the seal is eliminated. It should be understood that the compression springs 126 are captive between the central portion 120 of the drive sleeve and the seal ring carriers 130, 134 in substantially cylindrical holes in each, but float within the holes, as depicted in FIG. 2, to permit varying forces on the seal rings 140 and 144.

FIG. 4 also illustrates the positional relationship between the axially extended portions 122, 123 of the drive sleeve and the respective seal ring carriers 130, 134, which are mounted circumferentially around the inboard and outboard drive sleeve body portions and held in an axially floating or slidable relationship with O-rings 146 placed in slots around and between the drive sleeve and the seal ring carriers.

FIG. 5

Figure 5:
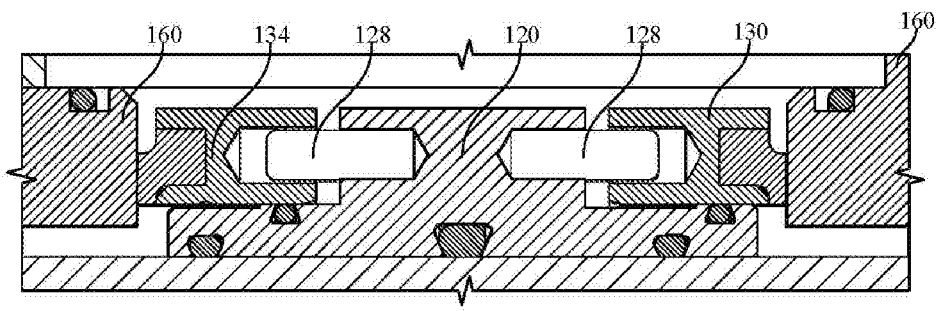
FIG. 5 is a detailed cross-sectional view of the rotating assembly at section 5-5 of FIG. 2.

FIG. 5 is a detailed cross-sectional view of the rotating assembly at section 5-5 of FIG. 2. The rotating assembly 100 additionally has a series of drive pins 128 disposed around the central portion of the drive sleeve 120 and captive between the central portion 120 of the drive sleeve and the inboard 130 and outboard 134 seal ring carriers, which drive pins 128 are structured and arranged to maintain the seal ring carriers 130, 134 in rotational alignment with the drive sleeve 120, 122 and 123. In this regard, it should be understood that the drive pins 128 are fixed to the central portion 120 of the drive sleeve, but float within substantially cylindrical holes in the seal ring carriers, as depicted in FIG. 2.

It can be particularly advantageous if the drive sleeve and the seal ring carriers are made of the same metal, or of metals having substantially the same thermal conductivities, such that there will be no drive pin interference due to thermal expansion. Additionally, since the seal ring carriers are metal, heat generated by the rotation of the seal rings is quickly transferred away from the seal rings due to the higher thermal conductivity of the metal of the seal ring carriers, relative to the fluoropolymer of the seal rings.

FIG. 6

Figure 6:
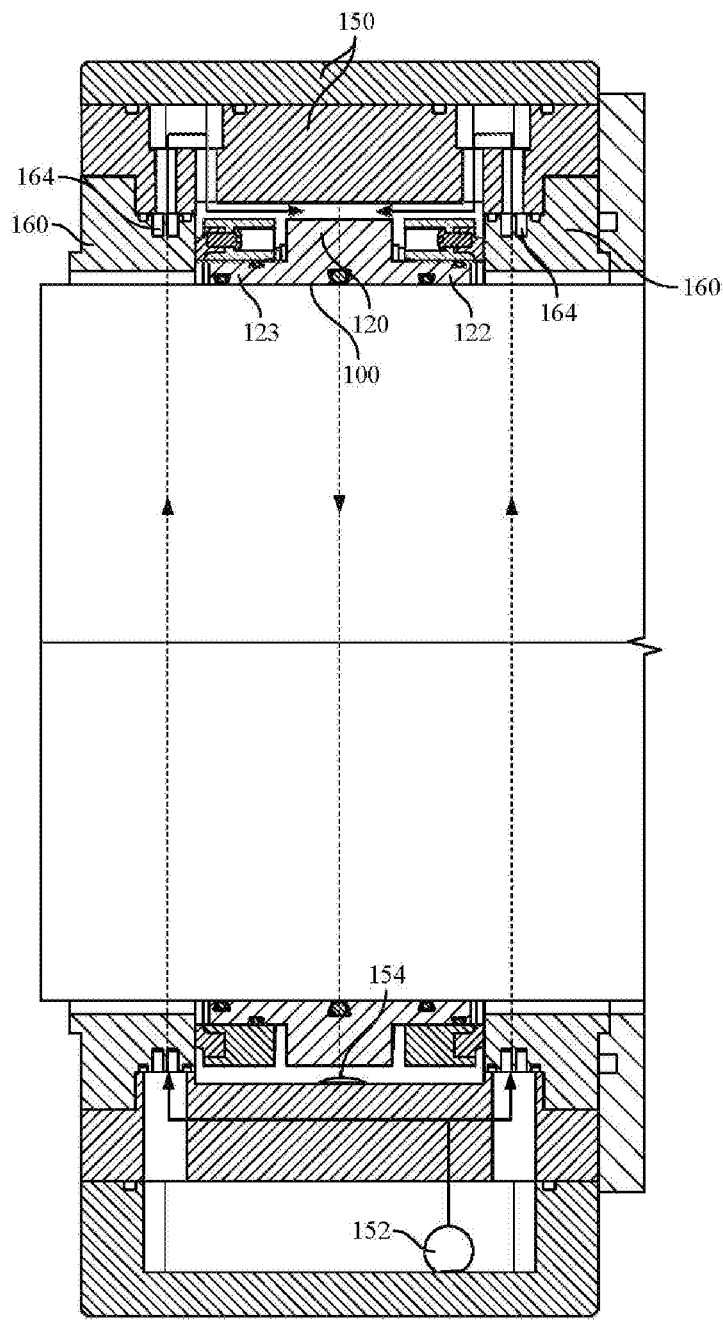
FIG. 6 is an overall cross-sectional view of the rotating shaft seal indicating the path of gas flow through the shaft seal.

As stated above, the extruder shaft seal of the present invention is configured to have a positive purge gas flow, rather than merely leak flow. FIG. 6 is an overall cross-sectional view of the extruder shaft seal indicating the path of gas flow through the shaft seal. Advantageously in this regard, the extruder shaft seal is configured with a purge gas inlet port 152 and a purge gas outlet port 154, both located generally near the bottom of the cylindrical housing 150. The particular positioning of the gas inlet and outlet ports is a matter of choice. A purge gas, such as $N_2$ follows the path indicated by the arrows in FIG. 6, such that it is directed through flow passages 164 provided by a series of grooves between fins cut into the outer circumference of mating rings 160, then passes into the cylindrical housing 150. The fins or passages 164 for purge gas flow around the mating rings 160 communicate with one or more spaces between outer surfaces of the rotating seal assembly 100 and the inner surface of the cylindrical housing 150, such that purge gas can be circulated throughout the extruder shaft seal. The purge gas is directed across the rotating assembly 100 over the central portion 120 of the drive sleeve body, then out of the extruder shaft seal through outlet port 154. The inlet and outlet ports are structured and arranged for gas fittings, such as being threaded to accommodate the fittings. In this way, the purge gas is not only supplied to the inlet fitting, but can also be collected from the outlet fitting and recycled, unlike the leak flow system of conventional extruder shaft seals.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" or "structured" and "arranged" mean that the element, component, or other subject matter is designed and/or intended to perform a given function. Thus, the use of the terms "adapted" and "configured" or "structured" and "arranged" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

INDUSTRIAL APPLICABILITY

The systems and methods disclosed herein are applicable to the polymerization industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A rotating shaft seal, comprising:
a substantially cylindrical housing structured and arranged to be affixed to an exterior wall of a machine housing and to receive a rotating shaft extending axially therethrough;
mating rings attached to the cylindrical housing, each ring having an axial aperture of sufficient diameter to accommodate said rotating shaft; and
an internal rotating sealing assembly, comprising:
a drive sleeve body structured and arranged to surround and contact said rotating shaft, the drive sleeve body having a central portion extending radially outward from the rotating shaft, and inboard and outboard portions extending axially along the rotating shaft;
inboard and outboard seal ring carriers mounted concentrically around the axially extending portions of the drive sleeve body; and
inboard and outboard seal rings positioned within outer surfaces on radial faces of both seal ring carriers, a surface of each seal ring biased axially into contact with said mating rings attached to the cylindrical housing;
wherein said rotating shaft seal rings further comprise blind flow passages formed on an outer circumference of the mating rings for purge gas flow around the mating rings;
wherein the substantially cylindrical housing comprises an inner surface and the blind flow passages for purge gas flow around the mating rings communicate with one or more spaces between outer surfaces of the rotating seal assembly and the inner surface of the substantially cylindrical housing, such that purge gas can be circulated throughout the rotating shaft seal; and
wherein said rotating shaft seal further comprises a purge gas inlet and a purge gas outlet in said substantially cylindrical housing.

2. The rotating shaft seal of claim 1, wherein the seal ring carriers are axially slidable on said axially extending portions of said drive sleeve body.

3. The rotating shaft seal of claim 1, further comprising a series of compression springs disposed around the central portion of the drive sleeve body and captive between said central portion and the inboard and outboard seal ring carriers, wherein the compression springs are structured and arranged to create a sealing force which substantially equally biases the seal ring carriers and the seal rings axially toward the mating rings of the substantially cylindrical housing.

4. The rotating shaft seal of claim 1, further comprising a series of drive pins disposed around the central portion of the drive sleeve body and captive between said central portion and the inboard and outboard seal ring carriers, which drive pins are structured and arranged to maintain the seal ring carriers in rotational alignment with the drive sleeve body.

5. The rotating shaft seal of claim 3, wherein the sealing force is created within the rotating assembly by the compression springs.

6. The rotating shaft seal of claim 1, wherein the seal rings are made from a fiber-reinforced fluoropolymer.

7. The rotating shaft seal of claim 1, wherein O-rings are placed in slots around and between the drive sleeve body and the seal ring carriers.

8. The rotating shaft seal of claim 1, wherein the drive sleeve body and the seal ring carriers are each made from a metal and the metal is the same.

9. The rotating shaft seal of claim 1, wherein the drive sleeve body and the seal ring carriers are made of metals and the metals have substantially the same thermal conductivities.

* * * * *